(12) United States Patent
Toriyama et al.

(10) Patent No.: US 8,537,300 B2
(45) Date of Patent: Sep. 17, 2013

(54) DISPLAY DEVICE

(75) Inventors: Yoshio Toriyama, Nagara (JP); Shinji Shimizu, Mobara (JP); Akio Tezuka, Mobara (JP); Masafumi Nagaoka, Chiba (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 247 days.

(21) Appl. No.: 12/700,760

(22) Filed: Feb. 5, 2010

(65) Prior Publication Data

US 2010/0201907 A1 Aug. 12, 2010

(30) Foreign Application Priority Data

Feb. 6, 2009 (JP) ................................ 2009-026040

(51) Int. Cl.
*G02F 1/1333* (2006.01)
(52) U.S. Cl.
USPC ........................................................... 349/58
(58) Field of Classification Search
USPC ..................................................... 349/58–60
See application file for complete search history.

(56) References Cited

U.S. PATENT DOCUMENTS

| 2005/0231658 A1* | 10/2005 | Chieh | 349/56 |
| 2008/0111949 A1* | 5/2008 | Shibata et al. | 349/64 |
| 2009/0128730 A1* | 5/2009 | Hsu et al. | 349/58 |

FOREIGN PATENT DOCUMENTS

JP 2008-216606 9/2008

* cited by examiner

*Primary Examiner* — Jessica M Merlin
(74) *Attorney, Agent, or Firm* — Antonelli, Terry, Stout & Kraus, LLP.

(57) ABSTRACT

A display device includes a display panel unit and a backlight unit which radiates light toward the display panel. The display panel unit includes a display panel on an upper surface of a box-shaped panel housing which has first projecting portions on side walls of the housing. The backlight unit incorporates a light source in a bottom portion of a box-shaped light source housing which has second projecting portions on side walls of the light source housing. By bringing the first projecting portions and second projecting portions into contact with each other, a distance between the light source of the backlight unit and the display panel can be held. Further, by forming third projecting portions which project further than the first projecting portions on the panel housing, handling of the display panel unit is facilitated.

9 Claims, 3 Drawing Sheets

DISPLAY DEVICE

CROSS-REFERENCE TO RELATED APPLICATION

The present application claims priority from Japanese application JP 2009-026040 filed on Feb. 6, 2009, the content of which is hereby incorporated by reference into this application.

BACKGROUND OF THE INVENTION

1. Field of the Invention

The present invention relates to a display device, and more particularly to a display device on which a display panel unit and a backlight unit are detachably mounted.

2. Background Art

Recently, a liquid crystal display device having the following constitution has been used popularly. In each of regions which are surrounded by a plurality of gate lines which extend in the x direction and are arranged parallel to each other in the y direction and a plurality of drain lines which extend in the y direction and are arranged parallel to each other in the x direction, a pixel which includes at least a thin film transistor controlled in response to a scanning signal from the gate line and a pixel electrode to which a video signal is supplied from the drain line via the thin film transistor is formed. Optical transmissivity is controlled independently with respect to the respective pixels via liquid crystal. The liquid crystal display device is a non-light-emitting display device and hence, the liquid crystal display device usually includes a liquid crystal display panel which controls optical transmissivity of the respective pixels independently and a backlight which radiates light to the liquid crystal display panel from a back surface of the liquid crystal display panel.

As the liquid crystal display device having such a constitution, there has been known a display device disclosed in JP-A-2008-216606, for example. As can be understood from the display device disclosed in JP-A-2008-216606, the conventional liquid crystal display device is formed of an integral body constituted of a liquid crystal display panel and a backlight.

SUMMARY OF THE INVENTION

On the other hand, along with spreading of a scope of application of a liquid crystal display device recent years, there arises a demand for a liquid crystal display device having the structure where a backlight unit in which a backlight is arranged and a liquid crystal display panel part are freely separable from each other.

As the liquid crystal display device having such structure, there has been proposed a liquid crystal display device having the following constitution. A liquid crystal display panel and a light source for a backlight are mounted on box-shaped frames having different sizes respectively. In a space defined by a side wall portion of one frame (for example, the frame of a liquid crystal display panel), a side wall portion of the other frame (for example, the frame of a backlight) is inserted along the side wall portion of one frame. Due to such a constitution, a display panel unit on which the liquid crystal display panel is mounted and a backlight unit are freely separable from each other.

In the liquid crystal display device having such a constitution, receiving bases which project toward the outside are formed on a side wall surface of the insertion frame, and mounting legs which project in the inserting direction and are located at positions where the mounting legs face the receiving bases at the time of insertion are formed on the inserted frame. Due to the provision of the receiving bases and the mounting legs, a relative insertion amount between the frames, that is, a distance between the liquid crystal display panel and the backlight is held at a predetermined distance.

In manufacturing the display panel unit having the above-mentioned constitution or temporarily storing the separated display panel unit, a method which holds the display panel unit in a self-standing posture in a most stable state is a method which holds the display panel unit in a self-standing posture with a surface of the display panel unit having a large area directed downward.

However, when the display panel unit is held in a self-standing posture such that a display screen, that is, a surface of the display panel unit on a side where the liquid crystal display panel is arranged is directed downward, there arises a drawback that a possibility that the liquid crystal display panel is broken is increased. Further, there also arises a drawback that, at the time of assembling the liquid crystal display panel, it is necessary to form the liquid crystal display panel by assembling constitutional parts from a side opposite to a display screen side and hence, the assembling operation efficiency is lowered.

As a method which can overcome this drawback, it is thought that the display panel unit is held in a self-standing posture by directing a surface of the display panel unit on a side opposite to the liquid crystal display panel which constitutes the other surface of the display panel unit downward, that is, by directing the surface of the display panel unit which is provided with the mounting legs on a side where the backlight frame is inserted downward. However, there arises a drawback that the mounting legs are deformed or broken due to a pressing force or the like which is generated in the assembling operation of the liquid crystal display panel and hence, the distance between the liquid crystal display panel and the backlight cannot be held at a predetermined distance. Further, the projection amounts of the mounting legs are set to different values corresponding to positions where the receiving bases are formed on the backlight unit and hence, there also arises a drawback that the projection amounts of all mounting legs cannot be set equal so that the display panel unit cannot be held in a stable self-standing posture.

The present invention has been made to overcome these drawbacks, and it is an object of the present invention to provide a technique which can, in a display device which is formed by engaging a display panel unit and a backlight unit with each other in a detachable manner, hold the display panel unit in a self-standing posture even when the display panel unit is in a single form separate from the backlight unit.

It is another object of the present invention to provide a technique which can prevent the deformation, breaking or the like of mounting legs of the display panel unit.

Other objects of the present invention will become apparent from the whole description of this specification.

To overcome the above-mentioned drawbacks, according to one aspect of the present invention, there is provided a display device which includes: a display panel unit; and a backlight unit which radiates light to the display panel unit from a back surface of the display panel unit, the backlight unit being arranged to face the display panel unit in an opposed manner, wherein the display panel unit includes a display panel and a box-shaped first housing, the first housing has a first-housing first surface on which the display panel is arranged, a first-housing second surface which faces the first-housing first surface in an opposed manner and has an opening portion, and a first-housing side wall which connects the first-housing first surface and the first-housing second surface to each other, the backlight unit includes a light source and a box-shaped second housing, the second housing has a second-housing first surface in which the light source is incorporated, a second-housing second surface which faces the second-housing first surface in an opposed manner and has an opening portion, and a second-housing side wall which connects the second-housing first surface and the second-housing second surface to each other, the first-housing side wall has first projecting portions which project in the opening direction of the first housing, the second-housing side wall has second projecting portions which are formed on a side wall portion of the second housing in a projecting manner and face the first projecting portions, and the first-housing side wall has third projecting portions which project further than the first projecting portions.

To overcome the above-mentioned drawback, in the display device according to one aspect of the present invention, at least one of the first projecting portion and the third projecting portion has a distal end portion thereof bent toward the outside of the first housing.

According to the display device of the present invention, by providing the projecting portions having a larger projection amount than the mounting legs to the display panel unit, even when the display panel unit is held in a self-standing posture in a single form with the surface opposite to the display panel, that is, a surface on a side where the backlight frame is inserted directed downward, the display panel unit can be held in a stable self-standing posture.

As a result, even when the display panel unit is held in a self-standing posture with the surface of the display panel unit opposite to the display panel directed downward, the projecting portions support the display panel unit and hence, it is possible to prevent the deformation or breaking of mounting legs due to a pressing force or the like which is generated in the assembling operation of the display panel.

Other advantageous effects of the present invention will become apparent from the description of the whole specification.

DESCRIPTION OF THE PREFERRED EMBODIMENT

Hereinafter, an embodiment to which the present invention is applied is explained in conjunction with drawings. In the explanation made hereinafter, parts having identical constitutions are given same symbols and their repeated explanation is omitted.

A display device of this embodiment includes a display panel unit and a backlight unit which radiates light to the display panel unit from a back surface of the display panel unit, and the display panel unit and the backlight unit are detachably engaged with each other.

The display panel unit includes a first housing having a box shape. The display panel is arranged on a first surface of the first housing, and a second surface of the first housing which faces the first surface in an opposed manner is opened along a side wall portion of the first housing.

The backlight unit includes a second housing having a box shape. A light source is mounted on a first surface of the second housing, a second surface of the second housing which faces the first surface in an opposed manner is opened along a side wall portion of the second housing.

The first housing includes the first projecting portions which are formed on and along the side wall surfaces of the first housing in the opening direction of the first housing and project from an opening face, and third projecting portions which are formed on and along the side wall surfaces of the first housing in the opening direction and projects further than the first projecting portions in the opening face direction of the first housing.

The second housing includes second projecting portions which are formed on side wall portions of the second housing in a projecting manner, faces the first projecting portions when the display panel unit and the backlight unit are engaged with each other in fitting engagement, and the display panel and the light source are engaged with each other with a predetermined distance therebetween.

(Overall Constitution)

Figure 1:
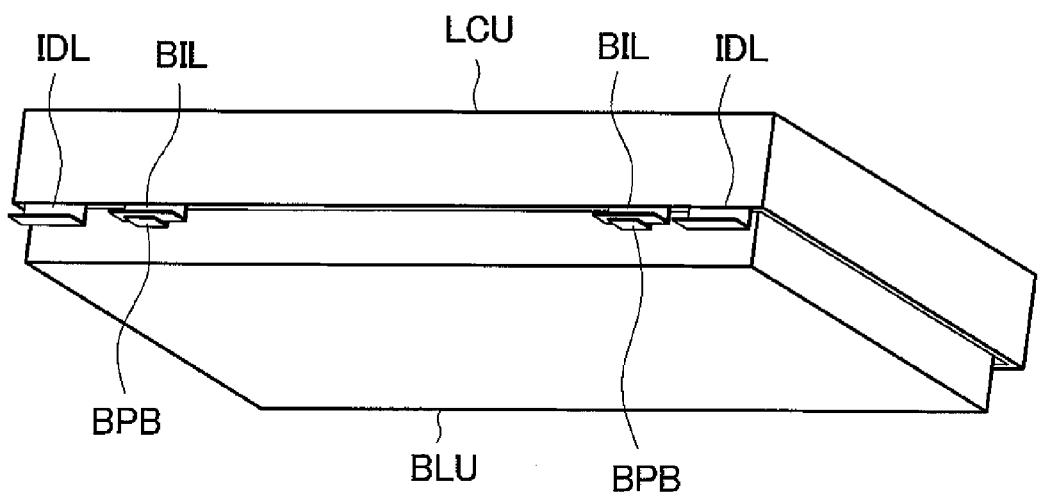
FIG. 1 is a perspective view for explaining the schematic constitution of a display device according to an embodiment of the present invention.
Figure 2:
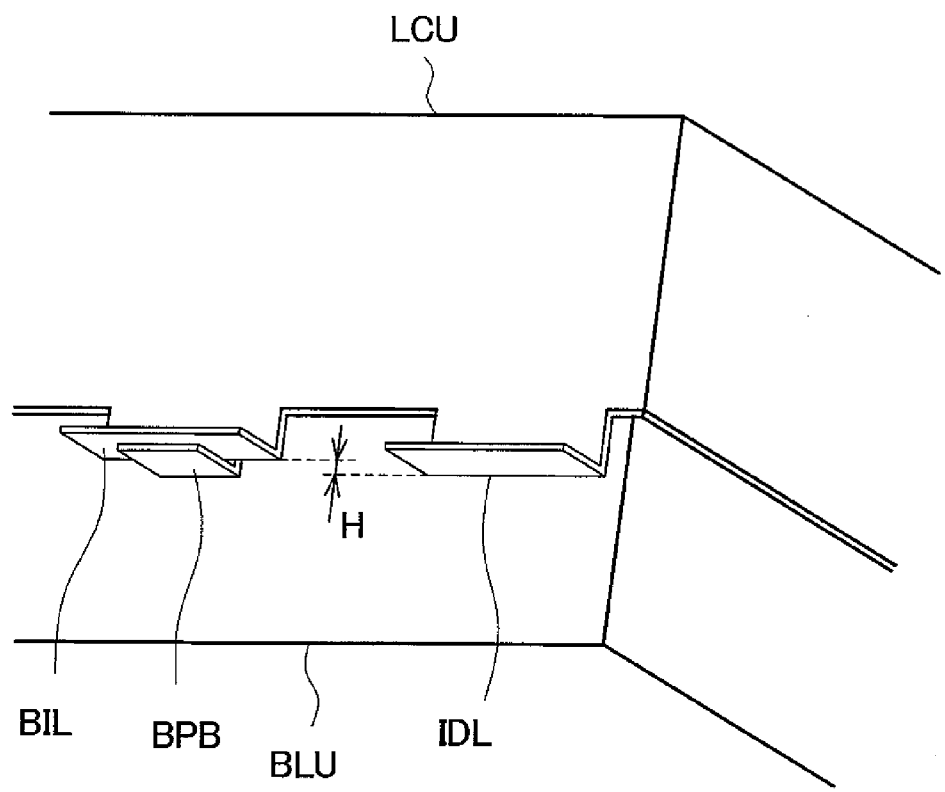
FIG. 2 is an enlarged view of the display device according to the embodiment of the present invention shown in FIG. 1.

FIG. 1 is a perspective view for explaining the schematic constitution of the display device according to the embodiment of the present invention, and FIG. 2 is an enlarged view of the display device shown in FIG. 1. Hereinafter, the explanation is made with respect to a case where the present invention is applied to a liquid crystal display device which is constituted of a liquid crystal display unit (display panel unit) LCU including a liquid crystal display panel as a display element, and a backlight unit BLU which radiates light of a backlight to the liquid crystal display panel from a back surface side of the liquid crystal display panel.

The liquid crystal display device of this embodiment shown in FIG. 1 functions as a liquid crystal display device by integrally engaging two units consisting of the liquid crystal display unit LCU which includes the well-known liquid crystal display panel and the backlight unit BLU which radiates light from the backlight to the liquid crystal display panel from the back surface side of the liquid crystal display panel by fitting engagement. Further, in the liquid crystal display device of this embodiment, the liquid crystal display unit LCU and the backlight unit BLU have an approximately quadrangular shape and are engaged with each other in a detachable manner. That is, the liquid crystal display unit LCU and the backlight unit BLU are integrally formed with each other by fitting a side wall portion of the liquid crystal display unit LCU on a side wall portion of the backlight unit BLU.

That is, to summarize, the display device of the present invention includes a display panel unit, and a backlight unit which radiates light to the display panel unit from a back surface of the display panel unit. The backlight unit is arranged to face the display panel unit in an opposed manner. In such a constitution, the display panel unit includes the display panel and the box-shaped first housing. The first housing has the first-housing first surface on which the display panel is arranged, the first-housing second surface which faces the first-housing first surface in an opposed manner and has the opening portion, and the first-housing side wall which connects the first-housing first surface and the first-housing second surface to each other. The backlight unit includes the light source and the box-shaped second housing. The second housing has the second-housing first surface in which the light source is incorporated, the second-housing second surface which faces the second-housing first surface in an opposed manner and has the opening portion, and the second-housing side wall which connects the second-housing first surface and the second-housing second surface to each other. The first-housing side wall has the first projecting portions which project in the opening direction of the first housing. The second-housing side wall has the second projecting portions which are formed on the side wall portion of the second housing in a projecting manner and face the first projecting portions. The first-housing side wall has third projecting portions which project further than the first projecting portions.

Hereinafter, the liquid crystal display device of this embodiment is explained in detail in conjunction with FIG. 1 and FIG. 2.

As shown in FIG. 1, the liquid crystal display device of this embodiment is formed by engaging the liquid crystal display unit LCU with the backlight unit BLU by fitting engagement. In this embodiment, the backlight unit BLU is made smaller than the liquid crystal display unit LCU in size.

That is, the liquid crystal display unit LCU includes an approximately quadrangular box-shaped housing (frame) LCU1 which has an opening on one planar portion thereof. A liquid crystal display panel not shown in the drawing is arranged outside a bottom surface of the housing LCU1 which is arranged opposite to the opening face. That is, an optical sheet and a liquid crystal panel are arranged on the frame LCU1 shown in FIG. 1. A window through which light from a backlight is transmitted to a back surface of the liquid crystal panel is formed on the bottom surface portion of the frame. Further, with respect to this frame LCU1 which forms the liquid crystal display unit LCU, a side wall portion of the frame LCU1 is formed perpendicular to a liquid-crystal-display-panel arrangement surface such that the surface (bottom surface) on which the liquid crystal display panel is arranged and the opening face of the above-mentioned one planar portion have the same size.

In the same manner as the liquid crystal display unit LCU, the backlight unit BLU also includes an approximately quadrangular box-shaped housing (frame, chassis) BLU1 which has an opening on one planar surface thereof. A light source (for example, cold cathode ray tube, LEDs or the like) not shown in the drawing is arranged on a bottom surface of the housing BLU1 which is arranged opposite to the opening face. Light radiated from the light source passes through the opening face of the backlight unit BLU and the window of the liquid crystal display unit LCU, and illuminates the liquid crystal panel from a back surface of the liquid crystal panel. Also with respect to the frame BLU1 which forms the backlight unit BLU, a side wall portion of the frame BLU1 is formed perpendicular to a backlight arrangement surface such that the surface (bottom surface) on which the light source is arranged and the opening face have the same size.

Further, in the liquid crystal display device of this embodiment, an inner peripheral side of the side wall portion of the liquid crystal display unit LCU is formed larger than an outer peripheral side of the side wall portion of the backlight unit BLU in size. Due to such a constitution, the side wall portion of the backlight unit BLU can be inserted into the liquid crystal display unit LCU along the side wall portion of the liquid crystal display unit LCU thus engaging the liquid crystal display unit LCU and the backlight unit BLU with each other by fitting engagement. That is, due to such a constitution, the liquid crystal display unit LCU and the backlight unit BLU can be engaged with each other or disengaged from each other when necessary.

In this embodiment, the frame BLU1 of the backlight unit BLU and the frame LCU1 of the liquid crystal display unit LCU are formed using a galvanized steel plate.

As shown in FIG. 2, in the liquid crystal display device of this embodiment, on a side wall surface of the backlight unit BLU, receiving bases BPB which are formed of a projecting portion projecting toward an outer peripheral surface (outside) are formed. The receiving bases BPB are, for example, formed by forming U-shaped notches on a long-side side wall portions and by bending the portions formed by the notches such that the portions are raised in the perpendicular and outward direction with respect to the side wall surface as shown in FIG. 2.

On the other hand, on long-side side wall surfaces of the liquid crystal display unit LCU which constitutes an inserted side, mounting legs BIL which are formed of a projecting portion projecting in the extending direction of the side-wall surface and in the opening direction are formed. That is, the mounting legs BIL which are formed of the projecting portion projecting toward a side where the backlight unit BLU is inserted are formed. The mounting legs BIL are formed at positions where the mounting legs BIL face the receiving bases BPB which are formed on the side wall portion of the backlight unit BLU when the backlight unit BLU is inserted into the liquid crystal display unit LCU. For example, the mounting legs BIL are formed by, at the time forming the side wall portions, forming extension portions which extend in the extending direction of the side wall portion from a peripheral portion which constitutes an opening side of the side wall portion and by, as shown in FIG. 2, bending distal end portions of the extension portions in the perpendicular and outward direction with respect to the side wall surface.

Due to the provision of these receiving bases BPB and the mounting legs BIL, a relative insertion amount between the respective frames, that is, a distance between the liquid crystal display panel and the backlight is held at a predetermined distance.

Further, in the liquid crystal display device of this embodiment, outside the mounting legs BIL, that is, in regions closer to four corners of the liquid crystal display unit LCU than the mounting legs BIL (for example, region on a right side of the mounting leg BIL in FIG. 2), a self-standing leg IDL is formed. The self-standing legs IDL are provided for preventing constitutional members on the opening side such as the mounting legs BIL from coming into contact with a surface of a desk when the liquid crystal display unit LCU is placed on a planar surface of a desk or the like with the liquid-crystal-display-panel side directed upward (the opening side directed downward). That is, in the liquid crystal display unit LCU of this embodiment, the self-standing legs IDL project further than the mounting leg BIL which projects most on the opening side by a height H. Due to such a constitution, in manufacturing the liquid crystal display unit or in temporarily storing the separated liquid crystal display unit, even when the liquid crystal display unit is held in the self-standing posture with the liquid-crystal-display-panel side directed upward, it is possible to prevent the mounting legs BIL from being deformed or broken due to a pressing force or the like which is generated in an assembling operation of the liquid crystal display panel.

Further, when the positions of the receiving bases BPB formed on the backlight unit BLU are different for respective receiving bases BPB, to hold the distance between the liquid crystal display panel and the backlight at a predetermined distance, it is necessary form the mounting legs BIL with projection amounts corresponding to the respective receiving bases BPB. In this case, although a projection amount from the side wall portion differs for every mounting leg BIL, the self-standing legs IDL are formed of the structural body different from the structural body of the mounting leg BIL. Accordingly, by setting the projection amounts of all self-standing legs IDL from the side wall portion to an equal value, it is possible to place the liquid crystal display unit LCU in a horizontally stable self-standing posture. The positions where the self-standing legs IDL are formed are not limited to the long-side side wall portions. That is, the self-standing legs IDL may be formed on the short-side side wall portions or the combination of the self-standing legs IDL formed on the short-side side wall portions and the self-standing legs IDL formed on the long-side side wall portions. Further, the self-standing leg IDL may be formed in regions more inside than the mounting legs BIL, that is, in regions remoter than the mounting legs BIL from four corners of the liquid crystal display unit LCU.

To explain the method for forming the self-standing legs IDL in the liquid crystal display device of this embodiment, in the same manner as the above-mentioned method for forming the mounting legs BIL, for example, the extension portions which extend in the extending direction of the side wall portion from a peripheral portion which constitutes an opening side of the side wall portion are formed at the time of forming the side wall portion, and distal end portions of the extension portions are bent in the perpendicular and outward direction with respect to the side wall surface as shown in FIG. 2 thus forming the self-standing legs IDL.

Figure 3A:
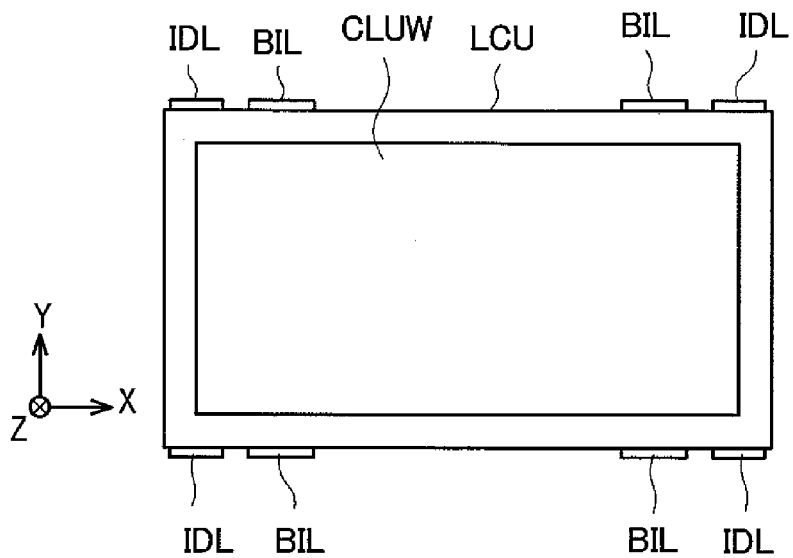
FIG. 3 is a view for explaining the schematic constitution of a liquid crystal display unit according to the embodiment of the present invention.
Figure 3C:
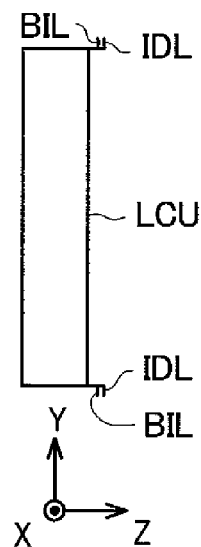
Figure 3B:
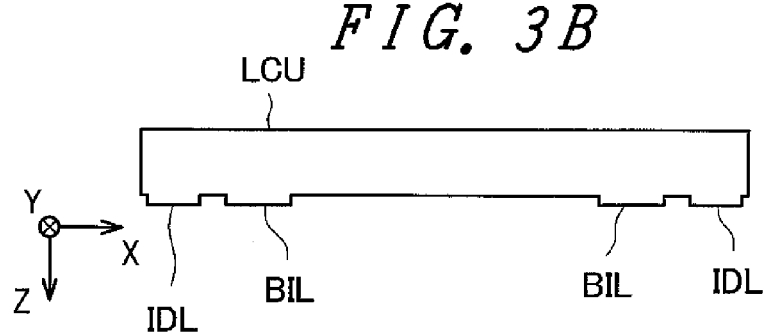
Figure 4A:
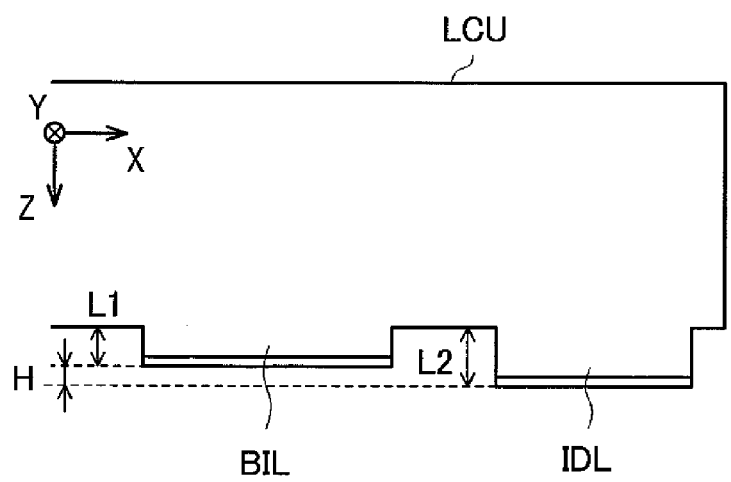
FIG. 4 is an enlarged view of the liquid crystal display unit according to the embodiment of the present invention shown in FIG. 3.
Figure 4B:
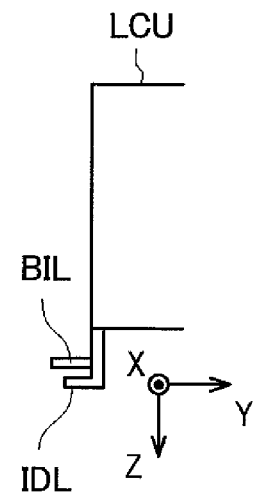
Figure 5:
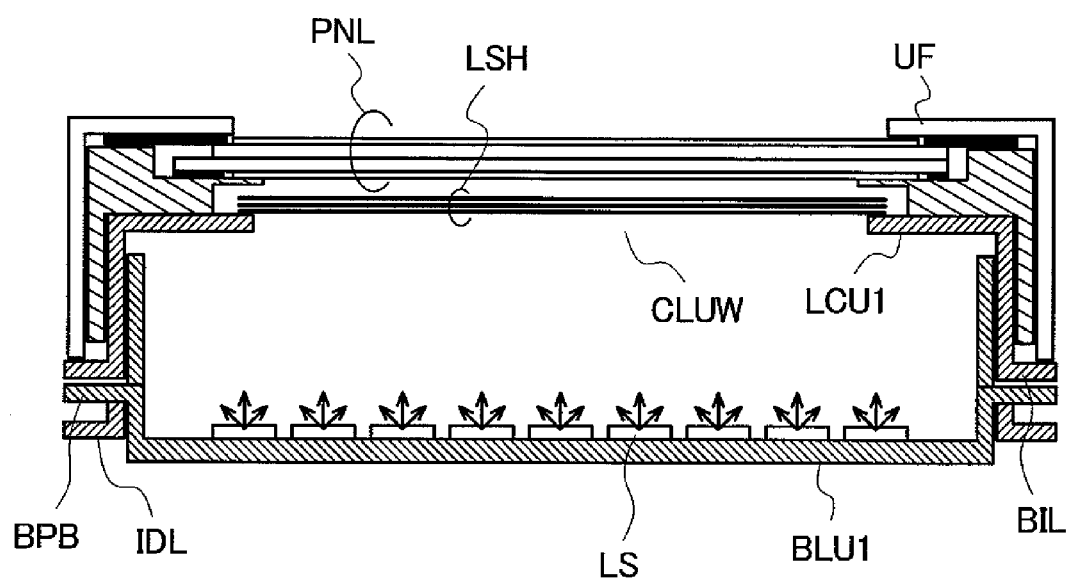
FIG. 5 is a cross-sectional view of the liquid crystal display unit according to the embodiment of the present invention shown in FIG. 3.

FIG. 3A to FIG. 3C are views for explaining the schematic constitution of the liquid crystal display unit according to the embodiment of the present invention, FIG. 4A and FIG. 4B are enlarged views of the mounting leg and the self-standing leg portion shown in FIG. 3, and FIG. 5 is a cross-sectional view of the liquid crystal display device. Hereinafter, the detailed constitution of the liquid crystal display unit according to this embodiment is explained in conjunction with FIG. 3A to FIG. 5. In the above-mentioned drawings, FIG. 3A is a plan view of the liquid crystal display unit of this embodiment, FIG. 3B is a side view of a long side of the liquid crystal display unit according to this embodiment, and FIG. 3C is a side view of a short side of the liquid crystal display unit according to this embodiment. Further, FIG. 4A is an enlarged view of the long side of the liquid crystal display unit according to this embodiment, and FIG. 4B is an enlarged view of the short side of the liquid crystal display unit according to this embodiment.

As shown in FIG. 3A, the liquid crystal display unit LCU of this embodiment includes a window CLUW which allows light transmitted from the backlight unit BLU to pass through the liquid crystal panel on an upper surface side thereof. The mounting legs BIL and the self-standing legs IDL are formed on two long-side side wall portions which are arranged to face each other at four corners of the liquid crystal display unit LCU respectively. Here, with respect to two side wall portions which are arranged to face each other, the self-standing legs IDL arranged on the side wall portion at an upper side of this drawing and the self-standing legs IDL which are arranged on the side wall portion at a lower side of the drawing are formed at positions symmetrical in the Y-axis direction respectively. However, positions where the self-standing legs IDL are formed are not limited to the symmetrical positions and may be asymmetrical positions.

Further, a housing which constitutes the liquid crystal display unit LCU of this embodiment is constituted of a lower frame not shown in the drawing which is a box-shaped frame on which the mounting legs BIL and the self-standing legs IDL are formed, and an upper frame not shown in the drawing which is engaged with the lower frame in a state that the upper frame covers an upper surface and a side wall surface of the lower frame which are exposed to the outside.

FIG. 5 is a cross-sectional view of the liquid crystal display device. The liquid crystal display unit LCU of this embodiment is constituted by sequentially arranging an upper frame UF, a liquid crystal display panel PNL, an optical sheet LSH, the housing of the liquid crystal display unit LCU, and the backlight unit BLU from a display screen side, that is, from a viewer's side.

Light sources LS are arranged on a bottom surface of the backlight unit BLU, and the light sources LS emit light toward the liquid crystal panel as indicated by arrows in the drawing.

The lower frame is a box-shaped frame which forms an opening in a portion thereof corresponding to a liquid crystal display region described later. In this embodiment, the lower frame is formed using a galvanized steel plate having a thickness of 1.0 mm. The mounting legs BIL and the self-standing legs IDL are integrally formed on the side wall portions of the lower frame. Above the lower frame, that is, on the back surface of the liquid crystal display panel, for example, the optical sheet which is constituted of a diffusion sheet, a prism sheet or a stacked body formed of these sheets is arranged. The optical sheet diffuses or converges light from the backlight unit BLU and guides such light toward a liquid-crystal-display-panel-PNL side.

The liquid crystal display panel PNL includes an envelope which is formed of a pair of substrates which is made of glass, for example, and is arranged to face each other in an opposed manner. Liquid crystal is sealed between the respective substrates. Pixels which are arranged in a matrix array are formed on liquid-crystal-side surfaces of the pair of substrates, wherein the pixel uses liquid crystal as one constitutional element thereof. Optical transmissivity of liquid crystal can be controlled for every pixel. A region in which these pixels are formed constitutes a liquid crystal display region. By radiating light from the backlight unit BLU to the whole area of the liquid crystal display region, and by allowing the light to pass through the respective pixels, it is possible to make a viewer recognize an image.

An opening is formed on a portion of the upper frame which faces the liquid crystal display region of the liquid crystal display panel PNL, and the upper frame is mounted on the lower frame by engagement.

In this manner, the liquid crystal display unit LCU of this embodiment is constituted such that the liquid crystal display panel PNL and the optical sheet are formed into a module by the lower frame and the upper frame.

Further, as shown in FIG. 3B, in the liquid crystal display unit LCU of this embodiment, the self-standing legs IDL are formed at the positions symmetrical with respect to the long-side direction of the side wall portions, that is, in the X-axis direction. Further, as shown in FIG. 3C, the distal end portions of the self-standing legs IDL are bent in the direction toward outer side surfaces of the side wall portions. However, positions where the self-standing legs are formed are not limited to the symmetrical positions and may be asymmetrical positions.

With respect to the self-standing legs IDL which are formed in this manner, as shown in FIG. 4A, assume a projection amount of the mounting leg BIL from the opening face of the side wall portion as L1, and a projection amount of the self-standing leg IDL from the opening face of the side wall portion as L2, and the difference between the projection amount L1 of the mounting leg BIL and the projection amount L2 of the self-standing leg IDL as H, the relationship of L2>L1 is established, and the difference H is 1 mm. However, the difference H between the projection amount L1 of the mounting leg BIL and the projection amount L2 of the self-standing leg IDL is not limited to 1 mm, and the difference H may be set to any value provided that the value of the difference H satisfies the relationship of L2>L1. However, to take a stepped portion or the like on a surface of a desk when the liquid crystal display unit LCU is placed on the desk or the like into consideration, it is preferable to set the difference H to 1 mm or more.

Further, as shown in FIG. 4B, with respect to a projection amount of the mounting leg BIL in the side surface direction, that is, in the direction parallel to the Y-axis a corresponding projection amount of the self-standing leg IDL is set smaller than the projection amount of the mounting leg BIL. However, the projection amount of the mounting leg BIL is not limited to such a relationship, and the projection amount of the mounting leg BIL may be equal to the projection amount of the self-standing leg IDL or the projection amount of the self-standing leg IDL may be set larger than the projection amount of the mounting leg BIL.

As has been explained heretofore, in the display device according to the embodiment of the present invention, the liquid crystal display unit LCU in which the liquid crystal display panel is arranged and the backlight unit BLU in which the backlight is arranged are each formed of a box-shaped frame. An opening is formed on a surface of each frame which is arranged opposite to a surface of the frame on which the liquid crystal display panel or the backlight is arranged, and the receiving bases BPB having a planar plate shape and projecting in the outer peripheral direction within the side wall surface are formed on the frame of the backlight unit BLU.

On the other hand, the mounting legs BIL are formed on the side wall surface of the liquid crystal display unit LCU in the extending direction of the side wall surface and project toward the opening face side, and the positions where the mounting legs BIL are formed are aligned with the positions where the receiving bases BPB are formed. Due to such a constitution, when the liquid crystal display unit LCU and the backlight unit BLU are engaged with each other by fitting engagement, it is possible to hold a distance between the backlight and the liquid crystal display panel at a predetermined distance. Here, in the liquid crystal display unit of the display device according to this embodiment, the self-standing legs IDL are formed such that the self-standing legs IDL project further than the mounting legs BIL (L2>L1) in the opening direction. Accordingly, even when the liquid crystal display unit LCU is placed on a desk or the like with the opening side thereof directed downward, the liquid crystal display unit LCU can maintain the self-standing posture thereof using the self-standing legs and hence, it is possible to hold the liquid crystal display unit LCU in the stable self-standing posture.

Further, in the display device of this embodiment, the self-standing legs IDL are formed such that the self-standing legs IDL project further than the mounting legs BIL in the opening direction. Accordingly, even when the liquid crystal display unit LCU is placed on the desk, it is possible to prevent the mounting legs BIL from coming into contact with the desk or the like thus bringing about a particularly advantageous effect that the deformation or breaking of the mounting legs BIL can be prevented.

In the liquid crystal display device of this embodiment, the lower end portion of the self-standing leg IDL has a distal end portion thereof bent outward in the same manner as the mounting leg BIL. However, the shape of the lower end portion of the self-standing leg IDL is not limited to such a shape, and bending may not be applied to the lower end portion of the self-standing leg IDL. However, by applying bending to the lower end portion of the self-standing leg IDL, the present invention can acquire a particularly advantageous effect that when the liquid crystal display unit LCU is placed on the desk or the like, it is possible to prevent a drawback that the self-standing leg IDL shaves a surface of the desk and shaved debris intrude into the inside of the liquid crystal display unit LCU or the like.

Further, the liquid crystal display unit LCU of this embodiment has been explained with respect to the case where the projection amount of length of the self-standing leg IDL in the side surface direction, that is, in the Y-axis direction is set smaller than the projection amount of length of the mounting leg BIL in the same direction. However, the present invention is not limited to such a case, and the projection amount of length of the self-standing leg IDL in the side surface direction may be equal to the projection amount of length of the mounting leg BIL in the side surface direction, or the projection amount of length of the self-standing leg IDL in the side surface direction may be set larger than the projection amount of length of the mounting leg BIL in the side surface direction. However, in the display device of this embodiment, as described previously, in engaging the liquid crystal display unit LCU and the backlight unit BLU by fitting engagement, the mounting legs BIL become the important constitutional members for holding the distance between the liquid crystal display panel PNL and the backlight at a predetermined distance by facing the receiving bases BPB formed on the backlight unit BLU. That is, the self-standing legs IDL become necessary at the time of manufacturing the liquid crystal display unit LCU or at the time of separating the liquid crystal display panel PNL and the backlight from each other and hence, it is desirable to form the self-standing legs IDL smaller than the mounting legs BIL for suppressing the projection amount of the self-standing leg IDL from the side surface thus preventing the self-standing legs IDL from impeding the usual use of the display device after the liquid crystal display unit LCU and the backlight unit BLU are integrally formed with each other.

Further, in the liquid crystal display unit LCU of this embodiment, the self-standing legs IDL are formed on four portions of the liquid crystal display unit LCU. However, the present invention is not limited to such a constitution, and the self-standing legs IDL may be formed on three or more portions of the liquid crystal display unit LCU so as to place the liquid crystal display unit LCU on a desk or the like in a stable posture in a single form. However, in assembling the liquid crystal display unit LCU, when the lower frame on which the self-standing legs IDL are formed is placed on a desk and constitutional parts are sequentially assembled to the lower frame, in this embodiment, the upper frame is engaged with the lower frame by fitting engagement as a last step of the assembling operation. Accordingly, to disperse a force necessary for the fitting engagement, it is desirable to form the self-standing legs IDL on at least four corners of the lower frame. Further, when the present invention is applied to the large-sized liquid crystal display device having a display screen of 20 inches or more, the number of self-standing legs IDL may be increased such that the self-standing legs IDL are formed at six portions of the lower frame of the liquid crystal display device consisting of four corners of the lower frame and one portion disposed in a center region of the respective long sides. By increasing the number of self-standing legs IDL in this manner, a load applied to one self-standing leg IDL at the time of manufacturing the liquid crystal display unit LCU can be distributed and, at the same time, it is possible to prevent the deformation or the like of the lower frame.

Further, in the liquid crystal display device of this embodiment, the backlight unit BLU is inserted into the liquid-crystal display unit LCU side. However, the present invention is not limited to such a constitution. That is, the outer peripheral side of the side wall portion of the box-shaped housing (frame) which forms the liquid crystal display unit LCU may be set larger than the inner peripheral side of the side wall portion of the box-shaped housing (frame) which forms the backlight unit BLU, and the liquid crystal display unit LCU may be inserted into the backlight unit BLU. In this case, it is necessary to form the receiving bases BPB which project in the inward direction on the side wall surface of the backlight and to bend the distal end portions of the mounting legs BIL and the distal end portions of the self-standing leg IDL in the inward bending direction.

Further, in the above-mentioned embodiment, the explanation has been made with respect to the case where the liquid crystal display panel is used as the display device. However, the present invention is not limited to the liquid crystal display device, and the present invention is also applicable to a display device of a type which can change a transmission quantity of light from the backlight by changing an opening amount or the like, for example. Further, the present invention is also applicable to a product which is formed by engaging a plurality of units with each other by fitting engagement.

What is claimed is:

1. A display device comprising:
   a display panel unit; and
   a backlight unit which radiates light to the display panel unit from a back surface of the display panel unit, the backlight unit being arranged to face the display panel unit in an opposed manner, wherein
   the display panel unit includes a display panel and a first housing,
   the first housing has a first-housing first surface on which the display panel is arranged, a first-housing second surface which faces the first-housing first surface in an opposed manner and has an opening portion, and a first-housing side wall which connects the first-housing first surface and the first-housing second surface to each other,
   the backlight unit includes a light source and a second housing,
   the second housing has a second-housing first surface, a second-housing second surface which faces the second-housing first surface in an opposed manner and has an opening portion, and a second-housing side wall which connects the second-housing first surface and the second-housing second surface to each other,
   the first-housing side wall has first projecting portions which are formed on a portion of the first-housing side wall and includes a first part which projects in the extending direction of a side wall surface thereof and in an opening direction of the first housing which extends in parallel to the first housing side wall surface and a second part which projects outwardly away from the first-housing side wall,
   the second-housing side wall has second projecting portions which are formed on a side wall portion of the second housing and have a part which projects outwardly away from the side wall and which enables contact with at least one of the first part and the second part of the first projecting portions of the first-housing side wall, and
   the first-housing side wall has third projecting portions which are formed on another portion of the first-housing side wall and includes a third part which projects in the opening direction of the first housing which extends in parallel to the first-housing side wall surface further than the first part of the first projecting portions and a fourth part which projects outwardly away from the first-housing side wall.

2. A display device according to claim 1, wherein at least one of the second part of the first projecting portion and the fourth part of the third projecting portion is a distal end portion thereof bent toward the outside of the first housing.

3. A display device according to claim 2, wherein the light source is mounted in the second-housing first surface.

4. A display device according to claim 2, wherein both of the first and third projecting portions have the bent distal end portion.

5. A display device according to claim 1, wherein the light source is mounted in the second-housing first surface.

6. A display device according to claim 1, wherein the second part of the first projecting portion which projects outwardly is a mounting leg which is bent toward the outside of the first housing, and the fourth part of the third projecting portion which projects outwardly is a self-standing leg which is bent toward the outside of the first housing,
   a length of the self-standing leg is smaller than a length of the mounting leg.

7. A display device according to claim 1, wherein at least one of the second portion of the first projecting portion and the fourth part of the third projecting portion is a distal end portion thereof bent so as to extend outwardly beyond a plane of the side-wall surface of the first-housing side wall.

8. A display device according to claim 7, wherein both of the first and third projecting portions have the bent distal end portion.

9. A display device according to claim 8, wherein the outwardly projecting part of the second projecting portions have a distal end portion bent outwardly from the side wail of the second housing so as to extend beyond a plane of a side wall surface of the second-housing side wall and which enables contact with the bent distal end portion of the first projecting portions.

* * * * *